United States Patent

[11] 3,621,269

| | | |
|---|---|---|
| [72] | Inventor | John J. Misencik<br>Pine Rock Park, Conn. |
| [21] | Appl. No. | 889,511 |
| [22] | Filed | Dec. 31, 1969 |
| [45] | Patented | Nov. 16, 1971 |
| [73] | Assignee | Westinghouse Electric Corporation<br>Pittsburgh, Pa. |

[54] PHOTOCONTROL APPARATUS PARTICULARLY FOR OUTDOOR POLE LANTERN
4 Claims, 4 Drawing Figs.

[52] U.S. Cl. .................................................. 250/227, 250/239
[51] Int. Cl. .................................................. G02b 5/14, H01j 5/02
[50] Field of Search .......................................... 250/227, 239; 315/156

[56] References Cited
UNITED STATES PATENTS

| | | | |
|---|---|---|---|
| 3,341,711 | 9/1967 | Shepard ...................... | 250/227 X |
| 3,496,422 | 2/1970 | Horowitz ..................... | 250/239 |
| 3,500,054 | 3/1970 | Lasalle et al. ................ | 250/227 |

Primary Examiner—David Schonberg
Assistant Examiner—Robert L. Sherman
Attorneys—A. T. Stratton, F. P. Lyle and Gordon H. Telfer ABSTRACT: For an electrical pole lantern or the like, a photocontrol adapter is provided having a base securable into the original lamp socket with a socket in the adapter for receiving a lamp to be photocontrolled. A photoelectrically responsive element within the adapter has a fiber optic light guide connected in optical relationship with it and extending from the adapter to receive exterior ambient light and conduct it to the responsive element. The fiber optic light guide permits use of the adapter with a variety of pole lantern configurations including those with decorative glass shields laterally enclosing the lamp while retaining good appearance and avoiding having electrical leads in any position where they are subject to damage or present an electrical hazard.

PATENTED NOV 16 1971 3,621,269

INVENTOR
John J. Misencik

BY Gordon H Telfer
ATTORNEY

PHOTOCONTROL APPARATUS PARTICULARLY FOR OUTDOOR POLE LANTERN

BACKGROUND OF THE INVENTION

1. Field of the Invention

The invention relates generally to photocontrol apparatus for turning on or off an electric lamp or appliance in accordance with ambient lighting conditions. In particular, the invention relates to photocontrol adapters for use with enclosed lamps such as outdoor pole lanterns.

2. Description of the Prior Art

Electric pole lanterns are widely used for decoration and safety. Existing ones are generally not designed originally for photoelectric control. Consequently, there has been a desire to provide an adapter for use with existing pole lanterns that will provide the photocontrol function. A number of criteria must be met by any such device. It must fit within the preexisting lantern design. It should be easy for the user, usually an individual homeowner, to install. It should not detract from the original esthetic design of the lantern; and, of course, it should be reliable and available at lowest possible cost. An additional requirement for such photocontrol apparatus is that it responds only to external light and not to light from the lamp within the lantern itself.

The foregoing criteria have only been partially satisfied by previous adapters for outdoor electric pole lanterns. There are two common techniques used in present photocontrol adapters. In one type, the photoelectric element and its associated circuitry for controlling the power to the lamp are within a fairly compact unit secured within the original lamp socket in the lantern. A tubular light shield is used to try to prevent light from the controlled lamp from impinging upon the photoelectric element. The tubular light shield is of opaque material such as paper or plastic, usually about one-half inch in diameter. Its remote end from the adapter is secured to the protective glass window of the lantern. The tubular light shield must of necessity be adjustable in length so it may be used with a variety of lanterns. This requires considerable care on the part of the user to adjust the length, usually by cutting, so that it fits snugly against the external glass window. Also, the lateral projection of the tubular light shield requires that any decorative glass around the lamp must be removed. Additionally, the lateral extension of the light shield detracts from the esthetic appearance of the lantern.

Another commonly used technique is that in which the photoresponsive element itself is encased and adhered to the protective glass window and wires run from it to an adapter at the lamp socket location. This provides an even more unsightly installation. It also means that any decorative glass chimney or the like around the lamp bulb will be resting on the wires and may sever the wires causing failure of the unit or an electrical hazard. Additionally, it is more costly to provide a separate unit for the photoelectric element on the external glass wall and a separate adapter at the socket.

Fiber optic light guides, sometimes referred to as light-conducting fibers, "light pipes," or the like, are known articles. Each individual fiber optic light guide comprises a fine thread or strand of light-transmissive material that transmits light from end to end with low losses through the sidewall because the material of the fiber, usually a glass, has a refractive index substantially higher than that of air. Generally, a bundle of a plurality of such individual strands is used in an application. Such fibers will conduct light even through a tortuous path. A number of applications of such articles have been proposed and used in various types of optical devices. To the present, however, there is no knowledge of any suggestion for use of fiber optic light guides in any way associated with photocontrol adapters for enclosed lamps such as in outdoor pole lanterns.

SUMMARY OF THE INVENTION

Among the objects of this invention, are to provide improved photocontrol apparatus, particularly for adapters in pole lanterns, that is easy for the consumer to use, readily applied to a wide range of fixture sizes, avoids electrical hazards, provides good appearance, provides a greater degree of directional control to avoid any unwanted ambient light, and permits use of decorative shields that are normally part of the original lantern design.

The above-mentioned and additional objects and advantages of the invention are achieved in apparatus wherein the photoelectrically responsive element and its associated circuitry are all within a single unit with a base for location in the original lamp socket and a second socket for the lamp to be photoelectrically controlled. A fiber optic light guide is attached in optical relation with the photoelectrically responsive element for its illumination. The fiber optic light guide may be variously positioned since it is very flexible. It can be twisted, embedded or placed in an inconspicuous position without loss of its essential function. It can be cut to the proper length by the user easily without any critical length control since it need not be straight. It can be placed under any existing light decorative shield. If accidentally cut or broken it will present no electrical hazard and can be easily replaced.

The light guide incurs some loss of radiation, such as about 10 percent over a 1-foot length, and also may not have a cross-sectional area equal to that of the photoelectrically responsive element. These factors have to be taken into account with the photocontrol circuitry used in the adapter. For this reason and also because of the desire to provide as compact a unit in the adapter as possible, it has been found preferably to employ solid-state photocontrol circuitry as opposed to electromechanical relays although the latter means may be employed if a suitably sensitive photoelectric element is employed. More than one light guide may be used in a single installation if desired to transmit additional radiation although for greatest economy it is desirable to use only one, which means that a limited-diameter cross section of light impinges upon the photoelectric element.

DESCRIPTION OF THE PREFERRED EMBODIMENTS

Figure 1:
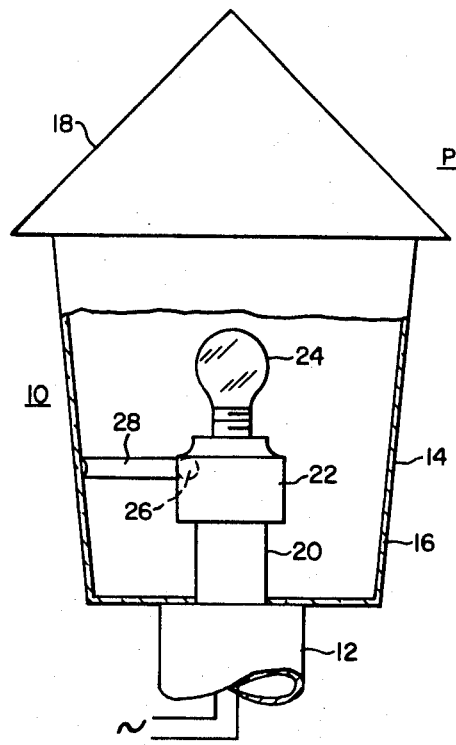
FIGS. 1 and 2 are elevation views in cross section of pole lanterns embodying photocontrol adapters in accordance with the prior art.
Figure 2:
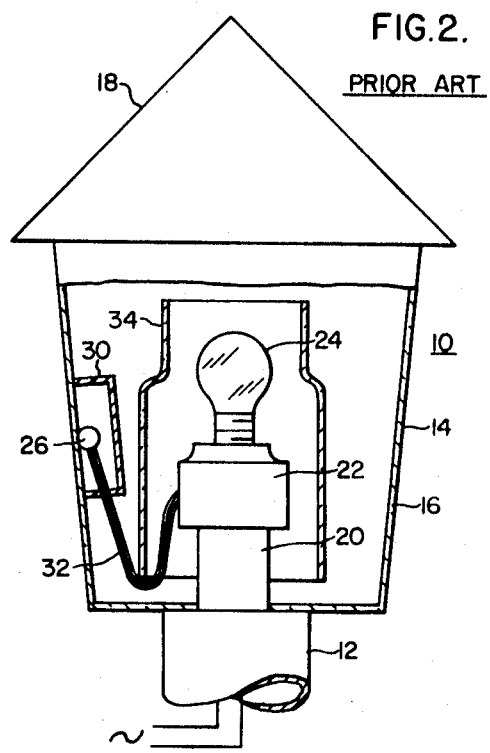

By way of background, reference is made to FIGS. 1 and 2, that illustrate apparatus in accordance with the prior art discussed hereinbefore. A pole lantern 10 has a pedestal 12 supporting a housing 14 that includes a light-transmissive wall 16 (e.g. glass) and is surmounted by a cover 18. Within the housing 14 is the original lamp socket 20 in which a photocontrol adapter 22 is provided, with an additional socket in the adapter 22 for a lamp 24 ("light bulb") to be placed therein and photoelectrically controlled.

In FIG. 1, a photoelectrically responsive element 26 and its associated circuitry are all contained within the adapter unit 22 located in the original socket 20 and a straight rigid light shield 28 extends laterally from the photoelement 26 to the glass wall 16 for shielding the photoelement 26 from light from the controlled lamp 24 with the attendant disadvantages that were previously discussed.

In FIG. 2, the situation is shown in which the photoelement 26 is separate from the remainder of the circuitry in the adapter 22 located at the socket 20. The photoelement 26 here is in a unit 30 located on the protective glass wall 16 and connected to the adapter 22 by wires 32. A decorative glass shield 34 surrounds the lamp 24. Such an installation also has substantial disadvantages as were previously discussed.

Figure 3:
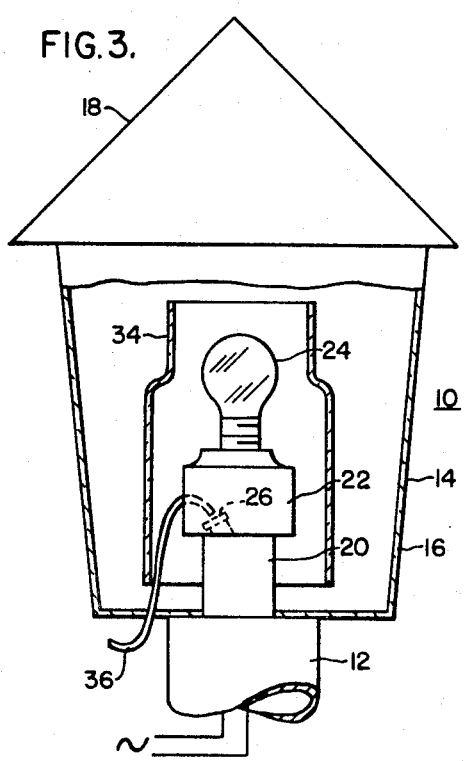
FIG. 3 is an elevation view in cross section of a pole lantern embodying a photocontrol adapter in accordance with the present invention.

In FIG. 3, an embodiment in accordance with this invention is shown in which the photoelement 26 and its associated circuitry are combined together in the adapter unit 22 located within the original lamp socket 20. A fiber optic light guide or "light pipe" bundle 36 is in optically coupled relation with the photoelement 26 and extends from the adapter 22 for any convenient length through any twists or turns as may be necessary to reach any convenient opening that permits it to extend from the enclosure 14 or to the glass wall 16 of the enclosure to receive ambient light from whatever direction may be desired.

It is usually convenient to employ as the photoelectrically responsive element 26 a photoresistor or some other element with an available area of approximately ½-inch diameter. The light pipe bundle 36, for its high flexibility and other qualities is desirably as small as possible, it having been found convenient to employ those having a diameter of only one-eighth inch or perhaps less. Consequently, a single light pipe bundle 36 will not illuminate the entire area of the photoelement 26. More than one light pipe bundle may be used if desired or the number of strands in the bundle increased.

It is desirable therefore to use a photocontrol circuit that is relatively sensitive, in addition to the other desirable qualities of being inexpensive and small in size. Such a photocontrol circuit is available and has been disclosed in U.S. Pat. No. 3,483,429, issued Dec. 9, 1969 to J. C. Engel et al. Reference to such patent should be made for description of a photocontrol circuit that provides the required degree of sensitivity. That circuit is characterized by including a solid-state symmetrical switch adapted to be connected in series with the lamp or other load across the supply of alternating voltage. The symmetrical switch is gated by a gate circuit that includes a trigger diode, a voltage divider network including a condition-sensing means such as a photoresistor, and a capacitor circuit. The sensing means is connected to develop a diode trigger voltage for gating the symmetrical switch when the condition (e.g. light) reaches a certain level during half cycle swings of one polarity of the alternating voltage. The capacitor circuit is connected to produce a series of gate pulses during the beginning and ending periods of the half cycle swings of the one polarity, and during whole periods of the half cycle swings of the other polarity of the alternating voltage.

Another suitable solid-state photocontrol circuit is that disclosed in U.S. Pat. No. 3,450,939, issued June 17, 1969, by the present inventor.

Figure 4:
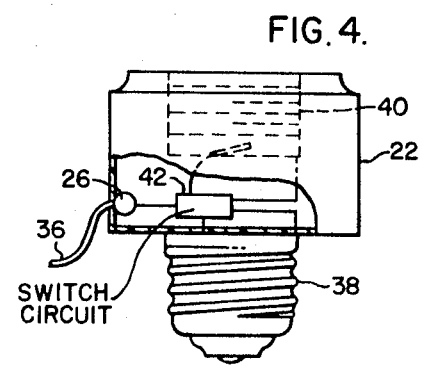
FIG. 4 is an enlarged view of the photocontrol adapter of FIG. 3.

FIG. 4 shows a photocontrol adapter as may be used in FIG. 3. The adapter unit 22 has a screw-type base 38 to screw the unit electrically and mechanically in a lamp socket. Within the adapter unit 22 is a socket 40 to receive a lamp to be photocontrolled. Schematically shown also are a photoelectrically responsive element 26 and a switch circuit 42 electrically coupled to the conductive elements of base 38 and socket 40. Details of suitable circuitry may be found in the above-referred-to patents.

While the invention has been shown and described in a few forms only, it is apparent that numerous changes may be made without departing from its true scope.

I claim:

1. Photocontrol apparatus for an electric lamp within a light-transmissive enclosure, said apparatus comprising: photocontrol adapter means having a base for securing said adapter means in a lamp socket, a controlled socket for receiving a lamp to be photocontrolled, photoelectrically responsive means within said adapter to turn on and off an electric circuit to said controlled socket; and a flexible light-conducting fiber extending from said adapter having one end in light coupling association with said photoelectrically responsive means and another end for location remote from said photoelectrically responsive means exposed to incident light.

2. The subject matter of claim 1 wherein: said photoelectrically responsive means comprises a photoresistor for control of a solid-state switching circuit.

3. An electric pole lantern comprising: a housing including a protective wall of light-transmissive material; a first lamp socket mounted within said housing and connected by conductors to an external power source; photocontrol adapter means having a base secured within said first lamp socket and having a second lamp socket for receiving a lamp to be controlled by said photocontrol adapter means; said photocontrol adapter means comprising a photoelectric element connected in an electrical circuit with said socket; a flexible light-conducting fiber having one end in light coupling association with said photoelectric element and extending from said photoelectric element to another end to conduct light received from outside said housing to said photoelectric element.

4. Photocontrolled electrical illuminating apparatus comprising: a housing including a light-transmissive wall; a lamp within said housing; conductive means entering said housing to electrically energize said lamp; photocontrol means within said housing and electrically connected with said conductive means to control the energization of said lamp in accordance with light level external to said housing; said photocontrol means including a photosensitive element; and a flexible light-conducting fiber having one end in light coupling association with said photosensitive element within said housing and a second end located external to said housing to receive only light external to said housing.

* * * * *